US007965187B2

(12) United States Patent
Malik

(10) Patent No.: US 7,965,187 B2
(45) Date of Patent: Jun. 21, 2011

(54) SYSTEM FOR LOCATING AND DESCRIBING

(75) Inventor: Ajay Malik, Santa Clara, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 568 days.

(21) Appl. No.: 12/145,812

(22) Filed: Jun. 25, 2008

(65) Prior Publication Data

US 2009/0322532 A1 Dec. 31, 2009

(51) Int. Cl.
*G08B 13/14* (2006.01)
(52) U.S. Cl. ........... 340/572.1; 340/539.11; 340/539.13; 340/825.49

(58) Field of Classification Search ............... 340/572.1, 340/572.3, 572.4, 539.11, 539.13, 539.21, 340/825.49
See application file for complete search history.

(56) References Cited

U.S. PATENT DOCUMENTS 7,589,616 B2 * 9/2009 Klatsmanyi et al. ......... 340/10.1
2006/0132304 A1 * 6/2006 Cabell ..................... 340/539.23
* cited by examiner

*Primary Examiner* — Hung T. Nguyen

(57) ABSTRACT

A system includes a tag associated with an item wirelessly transmitting data; a network device receiving the data and determining a location of the item; and a mobile unit receiving the location of the item from the network device. The mobile unit further receives the data from the tag and outputs a description of the item based on the data.

20 Claims, 3 Drawing Sheets

SYSTEM FOR LOCATING AND DESCRIBING

FIELD OF THE INVENTION

The present invention relates generally to a system for locating and describing an item. Specifically, a tag disposed on the item may transmit signals used for locating the item and describing the item.

BACKGROUND

A facility may have items that are disposed at various locations. For example, an auction house may have items that are lots to be auctioned. The items may initially be stored in a first location and subsequently moved to another location. In another example, a museum may have items such as artwork. The artwork may initially be displayed in a first location and subsequently moved to another location to be part of a different exhibit.

SUMMARY OF THE INVENTION

The present invention relates to a system which includes a tag associated with an item wirelessly transmitting data; a network device receiving the data and determining a location of the item; and a mobile unit receiving the location of the item from the network device. The mobile unit further receives the data from the tag and outputs a description of the item based on the data.

DETAILED DESCRIPTION

Figure 1:
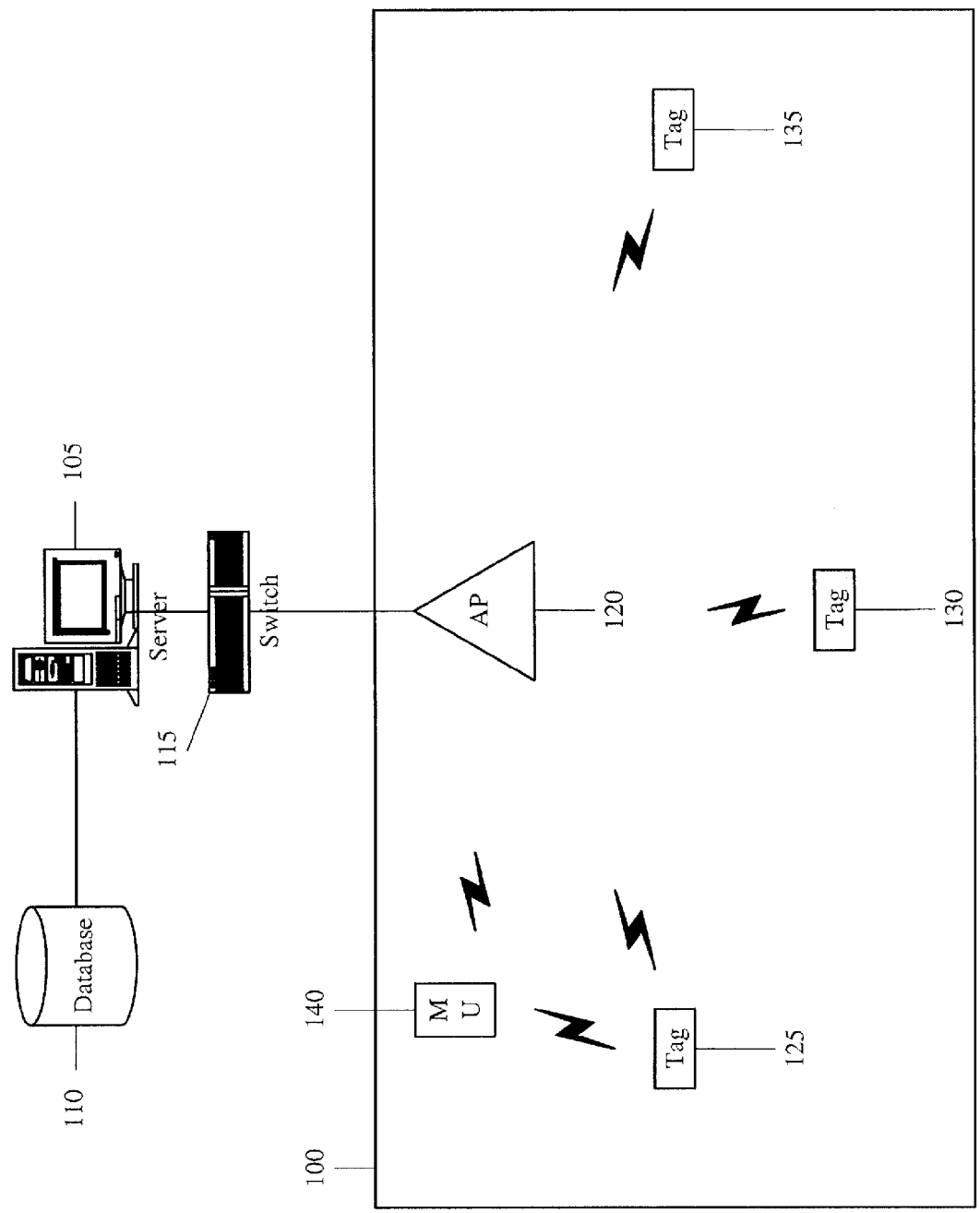
FIG. 1 shows a network according to an exemplary embodiment of the present invention.

The exemplary embodiments of the present invention may be further understood with reference to the following description and the appended drawings, wherein like elements are referred to with the same reference numerals. The exemplary embodiments of the present invention describe a system for locating and describing an item. According to the exemplary embodiments of the present invention, a tag may be disposed with the item so that the tag may transmit signals so that a mobile unit (MU) may receive location data relating to the item and receive description data relating to the item. The tag, the signals, the locating, and the describing will be discussed in further detail below.

FIG. 1 shows a network 100 according to an exemplary embodiment of the present invention. The network 100 may be any network such as a local area network (LAN), a wireless local area network (WLAN), a private area network (PAN), a virtual local area network (VLAN), a wide area network (WAN), etc. The network 100 may include a server 105, a database 110, a switch 115, an access point (AP) 120, and a plurality of tags 125-135. In addition, a mobile unit (MU) 140 may be disposed within the network 100. The MU 140 will be discussed in further detail below, in particular, with reference to FIG. 3.

The server 105 may be configured to be responsible for the operations occurring within the network 100. For example, the server 105 may associate authorized remote devices with the network 100. In another example, the server 105 may determine locations of components disposed within the network 100. The database 110 may store data relating to the network 100 such as association lists and location data. The network 100 may further include the switch 115 to direct data appropriately. For example, the signals transmitted from an associated remote device such as the MU 140 may be determined by the switch 115 to be forwarded to the server 105.

The network 100 may incorporate the AP 120 to extend a coverage area so that the tags 125-135 and the MU 140 may connect to the network 100 in a greater number of locations. The AP 120 may contain an individual coverage area that is part of an overall coverage area of the network 100. The AP 120 may serve as an intermediary for a transmission from the MU 140 to the switch 115. As illustrated, the MU 140 is wirelessly associated with the network 100 via the AP 120. It should be noted that the network 100 may include further APs to further extend the coverage area of the network 100. When the network 100 includes further APs, the MU 140 may roam to another coverage area in which one of the further APs provide.

The tags 125-135 may be disposed on an item within the network 100. For example, if the network 100 provides a coverage area for a facility such as an auction house, the tags 125-135 may be disposed on items to be shown on lots for auctioning. In another example, if the network 100 provides a coverage area for a facility such as a museum, the tags 125-135 may be disposed on items to be displayed in designated areas. The tags 125-135 may be any type of electronic tag, such as passive RFID tags, active RFID tags, semi-passive RFID tags, WiFi tags, etc. Those skilled in the art will understand that the system 100 may be modified to account for the type of tags being used. For example, if the tags 125-135 are RFID tags, the system 100 may also include one or more RFID readers and/or RFID antennas. Thus, when it is stated below that the tags 125-135 communicate with the AP 120, switch 115, and/or server 105, it should be understood that such communication may also include other intermediary devices such as antennas, readers, etc.

The tags 125-135 may wirelessly transmit first signals within the network 100. The first signals may be received by the AP 120 which forwards the first signals to the switch 115 which determines that the first signals are to be forwarded to the server 105. The server 105 may receive or determine a location in which one of the tags 125-135 is disposed. Accordingly, a location of the item with which one of the tags 125-135 is disposed may also be determined. The location may be determined by the server 105 using a variety of conventional methods such as triangulation, global positioning system (GPS), received signal strength indication (RSSI), etc. In another example, an RFID reader and/or the switch 115 may determine the location based on the receipt of the first signal (e.g., a specific antenna, a specific AP, etc.).

The tags 125-135 may also wirelessly transmit second signals within the network 100. The second signals may be received by the MU 140. The MU 140 may include the necessary hardware/software for receiving the second signals (e.g., an RFID reader). The second signals may encode description data relating to the item with which one of the tags 125-135 is disposed. It should be noted that the use of the auction house and the museum is only exemplary. Those skilled in the art will understand that the exemplary embodiments of the present invention may apply to any facility in which the tags 125-135 may be disposed.

According to a first exemplary embodiment of the present invention, the first signals of the tags 125-135 may be transmitted with a higher power so that the first signals may be received at a greater distance. The second signals of the tags 125-135 may be transmitted with a lower power so that the second signals may be received at a predetermined distance within a respective vicinity. That is, since the first signals may be used to determine a location of the tags 125-135, the server 105 may be required to receive the first signals. In a scenario where the tags 125-135 are disposed at a periphery of the coverage area of the network 100, the higher power may ensure that the first signals are capable of being received by the AP 120 (or other intermediary device) which may be disposed at an opposite periphery of the coverage area of the network. Since the second signals may provide description data and are to be received by the MU 140, the second signals may not be required to be transmitted at greater distances as the MU 140 is located at a close proximity to the tag when the description data is necessary.

According to a second exemplary embodiment, the first signals and the second signals of the tags 125-135 may be transmitted so that a greatest distance is achieved for the transmission. In such an embodiment, the first signals may be received by the AP 120 so that the server 105 may also receive the first signals. Therefore, the server 105 may determine the location of the tag. The second signals may also be received by the AP 120 so that the server 105 may also receive the second signals. The second signals being received by the server 105 may provide additional capabilities for the tags 125-135. For example, the second signals may encode obsolete description data while the database 110 includes updated description data for the item in which one of the tags 125-135 is disposed. The server 105 may interpret the second signals and determine the obsolete description data. Subsequently, the server 105 may transmit data to one of the tags 125-135 that updates the description data so that the one of the tags 125-135 now transmits second signals that encode the updated description data. In another example, the server 105 may receive the second signals and determine that the tag that is disposed on an item is transmitting an incorrect description data (e.g., the tag is disposed on a different item). An alert may be generated so that the misplaced tag may be appropriately disposed on the correct item.

Figure 2:
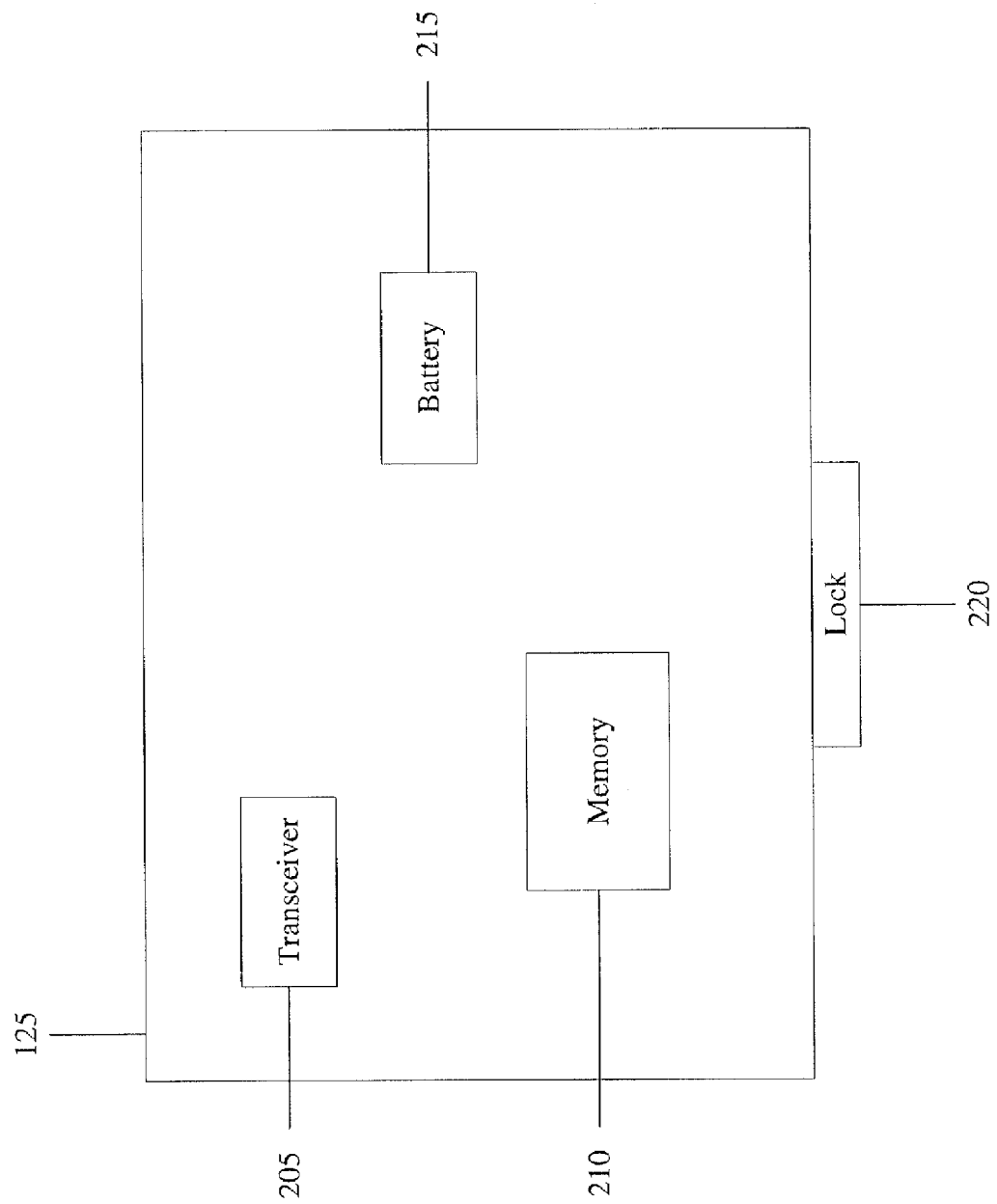
FIG. 2 shows a tag disposed on an item within the network of FIG. 1 according to an exemplary embodiment of the present invention.

FIG. 2 shows the tag 125 disposed on an item within the network 100 of FIG. 1 according to an exemplary embodiment of the present invention. The tag 125 may be any device that is capable of transmitting the first and second signals discussed above. For example, the tag 125 may be a passive radio frequency identification (RFID) tag, an active RFID tag, a semi-passive RFID tag, a WiFi tag, etc. The tag 125 may include a transceiver 205, a memory 210, a battery 215, and a lock 220. It should be noted that the following description for the tag 125 may also apply to any other tag such as tags 130-135 that may be disposed in the network 100.

The transceiver 205 may enable wireless signals such as the first and second signals discussed above to be transmitted. The first and second signals may be transmitted using an appropriate protocol dependent upon a type of the tag 125. For example, if the tag 125 is an RFID tag, radio frequency (RF) signals may be transmitted; if the tag 125 is a WiFi tag, signals corresponding to any of the IEEE 802.11 protocols may be transmitted; etc. The transceiver 205 may also enable wireless signals to be received. As discussed above, the server 105 may provide the tag 125 with updated description data. The signals from the server 105 encoded with the update description data may be received by the tag 125 via the transceiver 205.

The memory 210 may store data relating to the tag 125 and the item on which the tag 125 is disposed. That is, the memory 210 may include the data used to determine the location of the tag 125 by the server 105 and may also include the description data of the item. The location data (e.g., encoded as the first signals) may be, for example, an identity of the tag 125. Thus, when the server 105 determines or receives the location data, a locating method (e.g., triangulation, GPS, RSSI, etc.) may be used to determine the location of the tag 125 and the item on which the item 125 is disposed. The description data (e.g., encoded as the second signals) may be stored on the memory 210 in a dynamic manner. That is, the description data may be altered. For example, if the tag 125 is moved onto another item, the description data relates to the other item. In another example, if the description data is obsolete, the description data may be updated.

It should be noted that the use of the first and second signals is only exemplary. Accordingly, the use of the location data and the description data is only exemplary. In another exemplary embodiment, the location data and the description data may be encoded as a single signal that the tag 125 transmits. For example, the description data may serve as the identity of the tag 125. Thus, when the server 105 decodes the description data, a reference to a list stored on the database 210 may indicate the identity of the tag 125. Subsequently, the location of the tag 125 and the item may be determined.

The battery 215 may provide a power supply to the tag 125 so that the transceiver 205 is capable of transmitting and/or receiving the signals. The battery 215 may be rechargeable (e.g., NiCd, NiH, Li-Ion, etc.). However, it should be noted that depending on the type of the tag 125, the battery 215 may not be included. For example, if the tag 125 were a passive RFID tag, the tag 125 may not include the battery 215. It should also be noted that the tag 125 may include a connector to a permanent power supply (e.g., wall socket). In such an exemplary embodiment, the battery 215 may not be included.

The lock 220 may attach the tag 125 to the item. The lock 220 may be any attachment device. For example, the lock 220 may be a mechanical lock (e.g., a latch), an electrical lock (e.g., a solenoid), or a combination thereof. The lock 220 may be enable the tag 125 to be removably attached to the item so that the tag 125 may be reused when the item is no longer in use.

Figure 3:
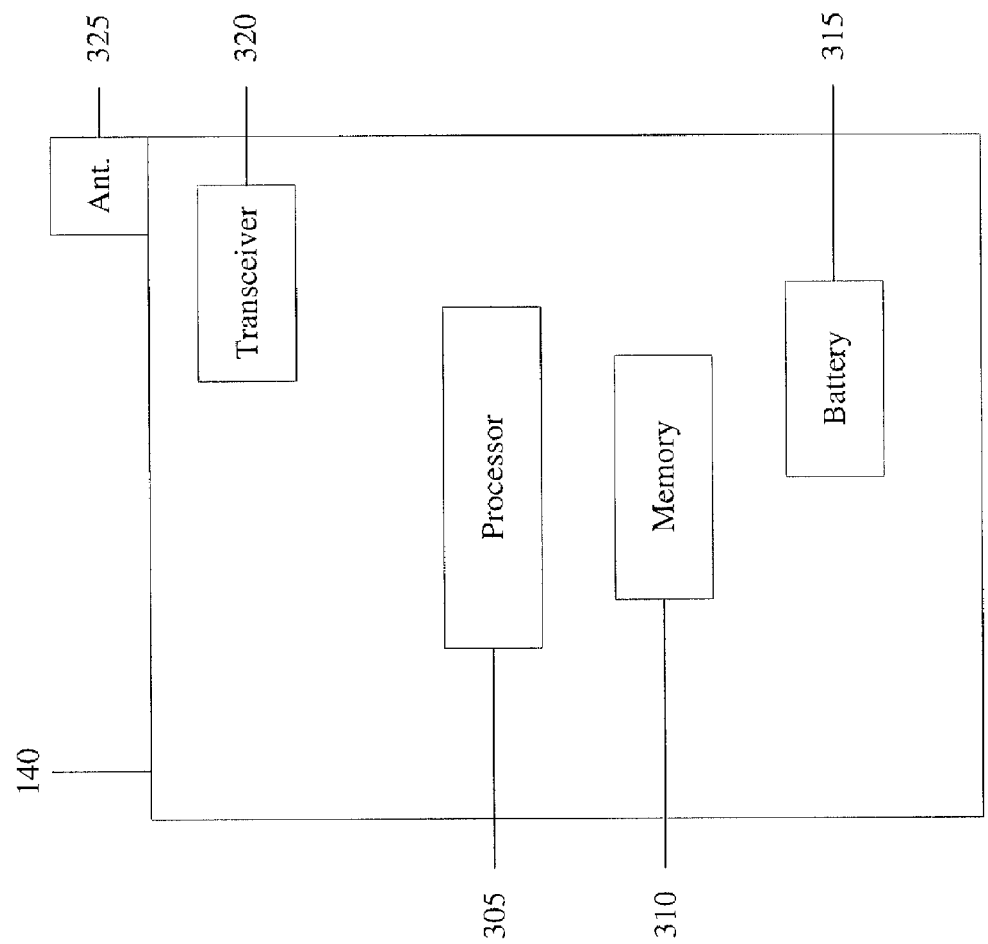
FIG. 3 shows a mobile unit disposed within the network of FIG. 1 according to an exemplary embodiment of the present invention.

FIG. 3 shows the MU 140 disposed within the network 100 of FIG. 1 according to an exemplary embodiment of the present invention. The MU 140 may be capable of an exchange of wireless signals from a network component or other components that transmit wireless signals. The MU 140 may be any portable electronic device such as a mobile computer, a personal digital assistant (PDA), a laptop, an RFID reader, a scanner, an image capturing device, a pager, etc. The MU 140 may include a processor 305, a memory 310, a battery 315, a transceiver 320, and an antenna 325.

The processor 305 may be configured to be responsible for the operations and functionalities of the MU 140. Specifically, the processor 305 may interpret the first and second signals transmitted from the tag 125. The processor 305 may execute a program that performs the interpretation of the first and second signals. Subsequently, a corresponding action may be taken. The corresponding actions will be discussed below. The memory 310 may be a storage unit for the MU 140. For example, if the MU 140 receives the first and second signals, these signals may be stored on the memory 310. The battery 315 provides a power supply to the MU 140. The battery 315 may be rechargeable.

The transceiver 320 may be substantially similar to the transceiver 205 of the tag 125. Specifically, the transceiver 320 may enable wireless signals to be exchanged (e.g., transmitted and/or received). The transceiver 320 may be configured with the appropriate protocol so that the wireless signals may be received dependent upon the type used by the network 100. The transceiver 320 may transmit and/or receive signals via the antenna 325.

An initial step for the MU 140 may be to configure the MU 140 (e.g., the processor 305) with an appropriate program related to the facility in which the network 100 provides a coverage area. For example, the initial step may be performed after an association process. When the MU 140 associates with the network 100, the MU 140 may receive the program and become installed thereon. In another example, the initial step may be performed any time prior to receive the first and second signals such as manually installing the program onto the MU 140. It should be noted that the configuring of the MU 140 may not include an installation of the appropriate program. The exemplary embodiments of the present invention may also utilize already installed programs on the MU 140.

The program installed on the MU 140 may enable the location data to be interpreted. As discussed above, a user of the MU 140 may query the server 105 for a location of a specific item in which the tag 125 is disposed. The item may be known to the user, selected from a list provided by the server 105, etc. The server 105 may receive the request and reply to the MU 140 with the appropriate location data. Upon receiving the location data, the location of the item may be presented on a display of the MU 140 to the user. For example, the location data may indicate an area of the facility. In another example, the location data may be used to highlight a section of a layout or a map of the facility that is shown on the display. It is again noted that the server 105 may have already received the first signals from the tag 125 to determine the location using any of the above listed methods.

Upon the user of the MU 140 receiving the location of the item of interest, the user with the MU 140 may relocate to an area within a vicinity of the item. As discussed above, the second signals transmitted from the tag 125 may be transmitted with a predetermined power so that the second signals radiate from the tag 125 at a predetermined distance. When the user has relocated within the vicinity of the item, the MU 140 may be in wireless communication with the tag 125. Accordingly, the transceiver 320 may also receive the description data (e.g., encoded as the second signals) from the tag 125. The processor 305 of the MU 140 may decode the second signals to provide the description of the item on the display for the user.

The exemplary embodiments of the present invention enable a tag to be disposed with an item to provide a location of the item as well as a description of the item. The tag may transmit at least one signal to provide both the location and the description of the item. An MU disposed in a network that provides a coverage area for a facility in which the item is located may receive the location and the description. The exemplary embodiments of the present invention may also enable a more time appropriate providing of the description of the item. Specifically, the description of the item is provided when the MU is within a vicinity of the item itself.

It should be noted that the second signals may include the actual descriptions (text, audio, video, etc.) that are displayed to the user. However, it is also possible that the actual descriptions have been previously stored on the MU 140 and the description data is used to retrieve the actual descriptions from a memory of the MU 140. In a further example, the actual descriptions may be stored on the server 105 and the MU 140 may use the description data to retrieve the actual descriptions from the server 105.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A system, comprising:
   a tag associated with an item wirelessly transmitting data;
   a network device receiving the data and determining a location of the item; and
   a mobile unit receiving the location of the item from the network device, the mobile unit further receiving the data from the tag and outputting a description of the item based on the data.

2. The system of claim 1, wherein the description is one of a text description, an audio description, and a video description.

3. The system of claim 1, wherein the description is one of included in the data, stored in the mobile unit, stored in the network device, and stored in a further network device.

4. The system of claim 1, wherein the tag is one of a passive radio frequency identification (RFID) tag, an active RFID tag, a semi-passive RFID tag, and a WiFi tag.

5. The system of claim 1, wherein the data comprises a first portion and a second portion, the first portion being used to determine the location and the second portion being used to output the description.

6. The system of claim 5, wherein the location is determined using one of a triangulation, a global positioning system (GPS), and a received signal strength indication (RSSI).

7. The system of claim 5, wherein the first portion is transmitted by the tag using a greater power than the transmission of the second portion.

8. The system of claim 1, further comprising:
   at least one further tag associated with a further item wirelessly transmitting further to the network device to determine a further location of the further item and to the mobile unit to output a further description of the further item.

9. The system of claim 1, wherein the network device verifies that the description of the item is correct.

10. The system of claim 5, wherein the network device transmits an updated second portion of the data to the tag.

11. A method, comprising:
    transmitting data from a tag associated with an item to a network device and a mobile unit;
    determining, by the network device, a location of the item;
    transmitting the location from the network device to the mobile unit; and
    outputting a description of the item based on the data.

12. The method of claim 11, wherein the description is one of a text description, an audio description, and a video description.

13. The method of claim 11, wherein the description is one of included in the data, stored in the mobile unit, stored in the network device, and stored in a further network device.

14. The method of claim 11, wherein the tag is one of a passive RFID tag, an active RFID tag, a semi-passive RFID tag, and a WiFi tag.

15. The method of claim 11, wherein the data comprises a first portion and a second portion, the first portion being used for the determining of the location and the second portion being used for the outputting of the description.

16. The method of claim 15, wherein the determining of the location uses one of a triangulation, a GPS, and a RSSI.

17. The method of claim 15, wherein the first portion is transmitted using a greater power than the transmission of the second portion.

18. The method of claim 11, further comprising:
verifying, by the network device, that the description of the item is correct.

19. The method of claim 15, further comprising:
transmitting an updated second portion of the data from the network device to the tag.

20. A system, comprising:
a transmitting means for wirelessly transmitting data, the transmitting means being associated with an item;
a network device receiving the data and determining a location of the item; and
a mobile unit receiving the location of the item, the mobile unit further receiving the data from the transmitting means and outputting a description of the item based on the data.

* * * * *